Figure 4:
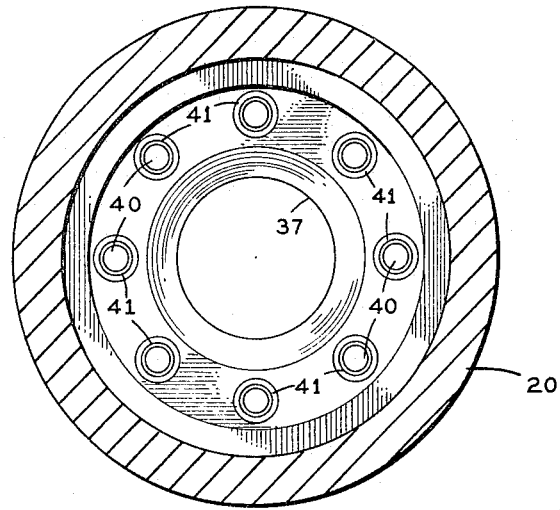

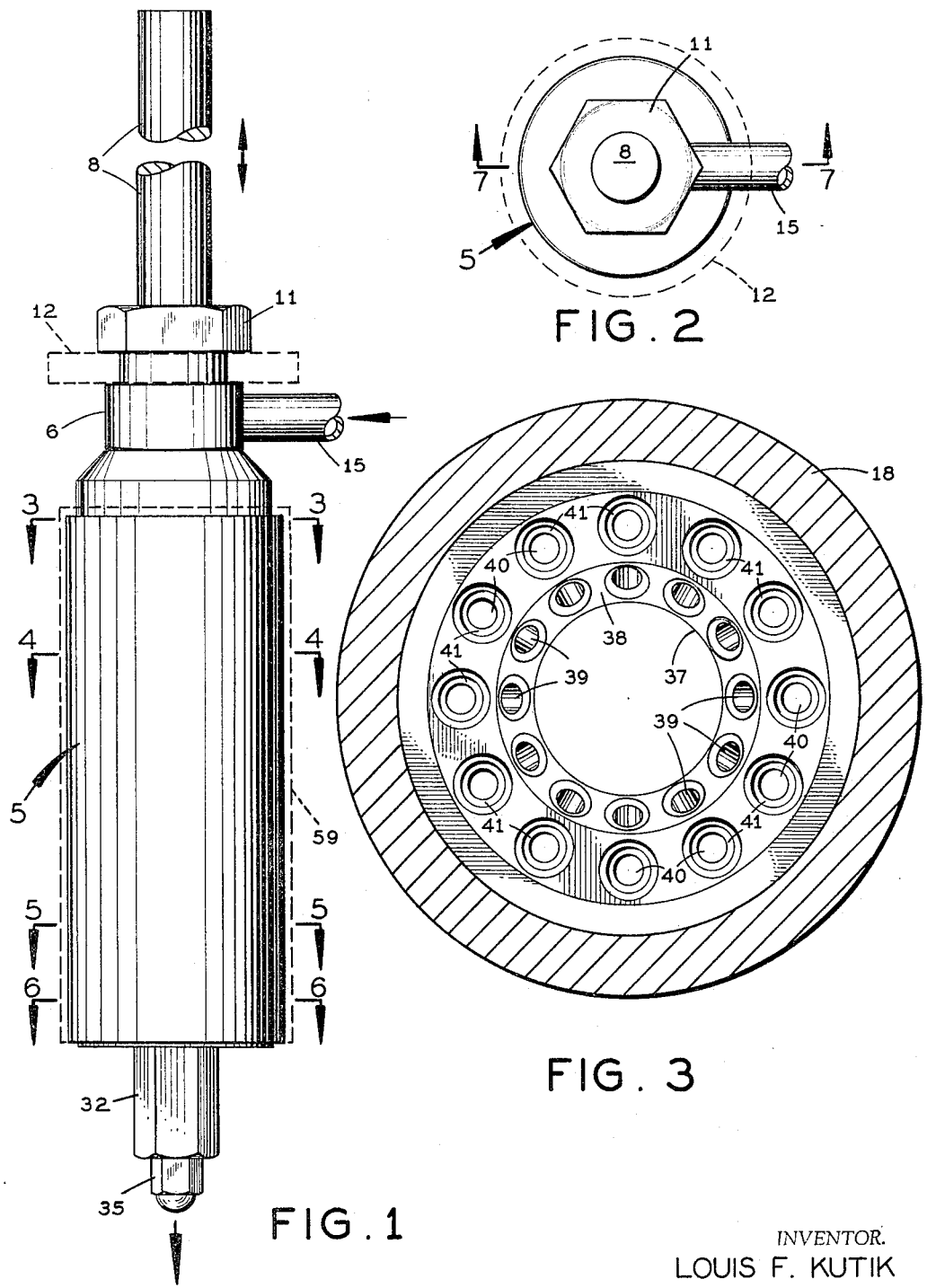

Nov. 15, 1966   L. F. KUTIK   3,284,854
PROGRESSIVE PLASTIC INJECTION SYSTEM
Filed Jan. 29, 1964   4 Sheets-Sheet 2

INVENTOR.
LOUIS F. KUTIK
BY
ATTORNEY

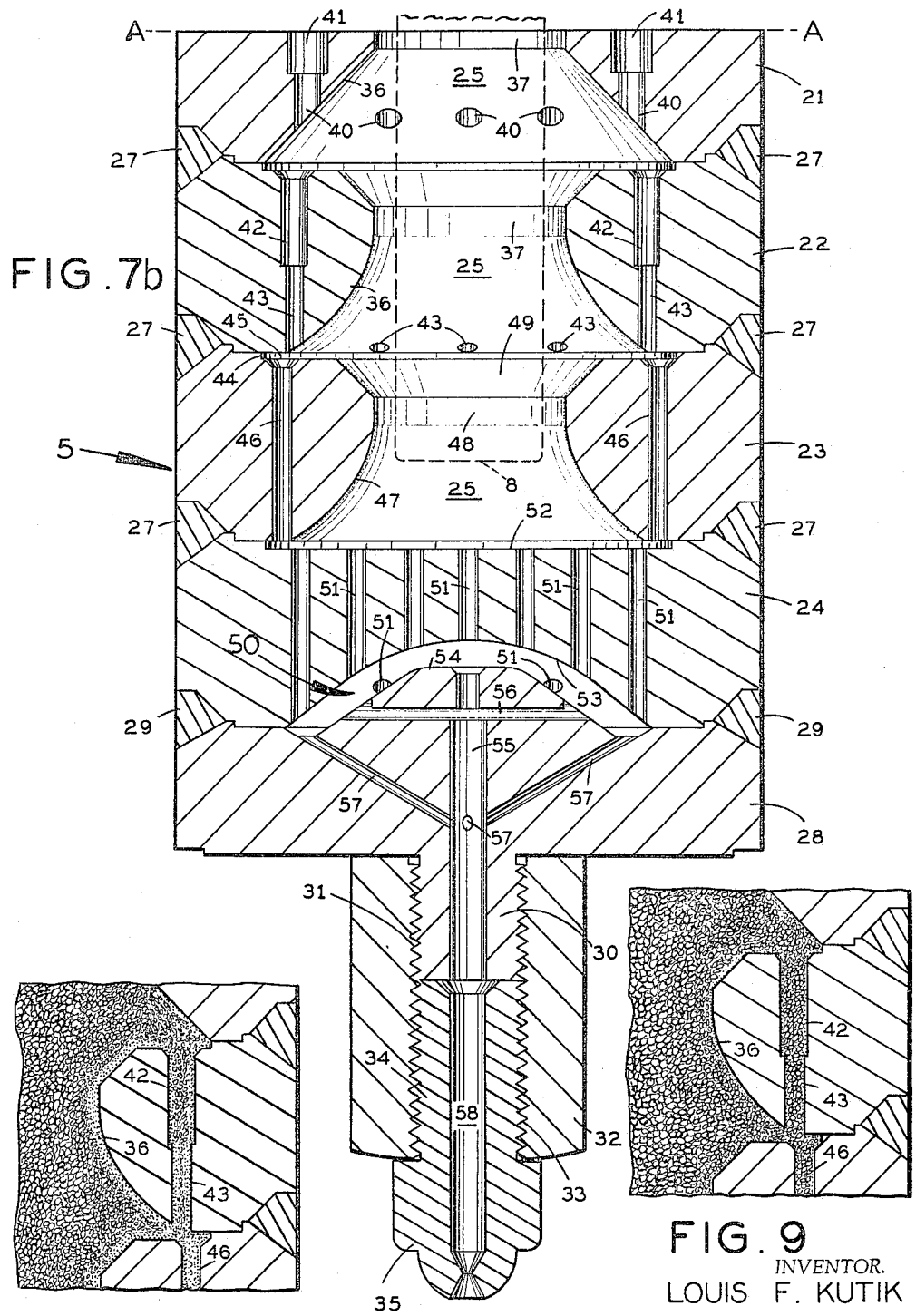

United States Patent Office 3,284,854
Patented Nov. 15, 1966

3,284,854
PROGRESSIVE PLASTIC INJECTION SYSTEM
Louis F. Kutik, Fort Lauderdale, Fla., assignor of one-half to Erich W. Gronemeyer, Fort Lauderdale, Fla.
Filed Jan. 29, 1964, Ser. No. 341,017
4 Claims. (Cl. 18—30)

This invention relates to plastic molding machines and has particular reference to a cylinder device wherein the plastic is progressively fed from an upper end of the cylinder to be forced downwardly by a plunger and wherein the plastic granules are progressively melted into a fluent condition for ejection into a mold.

The invention contemplates a cylinder having a plurality of cavities and with the walls of the cylinder being heated in any conventional manner whereby the plastic granules are progressively fed inwardly through the cavities to progressively heat and melt the granules in a novel manner for subsequent ejection in a fluent state from a nozzle at the lower end of the cylinder to be forced into a mold cavity.

To facilitate the manufacture of the cylinder and the cavities, the cylinder is formed of a plurality of segments each having a cavity therein and with the segments being welded together to produce an elongated cylinder and with the cavities being of taper form for causing the granules to traverse the several segments in a manner and under the influence of a piston device and wherein the granules are fed into an upper end of the cylinder and forced inwardly by the piston to cause the granules to impinge against the inner walls of the segments in a manner to progressively melt the granules so that the granules, when approaching the lower end of the cylinder will be in a fluent state for ejection from the nozzle and with the construction being such that more heating surface is provided for the melting of the granules in comparison to the well known torpedo type cylinders and screws.

The device provides a higher injection pressure at the nozzle end of the cylinder, comparable and almost equal to the input pressure at any stage of injection.

With this invention, it is possible to provide a most satisfactory dispersion of color and mixture of materials and permits a lower clamping pressure on a mold, due to the fact that the material being injected at uniform injection pressures at all stages of the invention. The device further eliminates the use of the well known cold torpedo or cold screw that would retard the flow or melting of the plastic.

Further, less travel time on the piston injecting material due to the cushion having no effect on the injection pressure and a small amount of material is taken from the cylinder, as it comes from the hopper end and not the nozzle end.

A further advantage of the device consists in simplicity of cleaning the male thread from any deposits of the plastic and further provides a replaceable nut that renews the internal thread for the nozzle.

A further object of the invention resides in a dispersion section that is an integral part of the injection cylinder.

Another object of the invention consists in a cylinder that harnesses the side pressure of the wedge-shaped action of the injection plunger or the wedge-shaped action of the plastic that would normally stay stagnant on the end of a flat injection piston and also permits the use of a much shorter cylinder and to plasticize much more material because of the larger area of heating surfaces and also, the heat of the cylinder does not need to be set higher than the heat that is desired on the material, therefore no override of heat on material and no burning if left standing for short periods of time.

Novel features of construction and operation of the device will be more clearly apparent during the course of the following description, reference being had to the accompanying drawings wherein has been illustrated a preferred form of the device and wherein like characters of reference are employed to denote like parts throughout the several figures.

Figure 5:
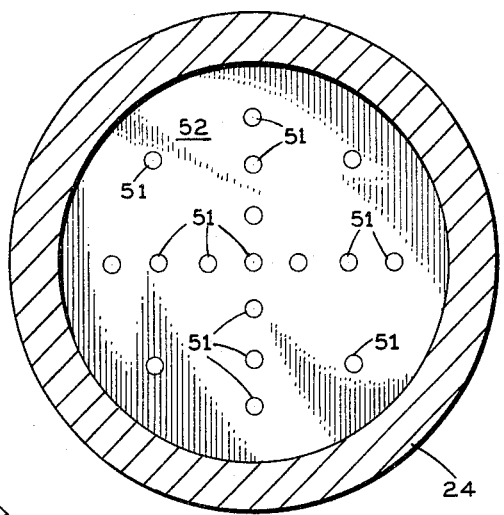
Figure 6:
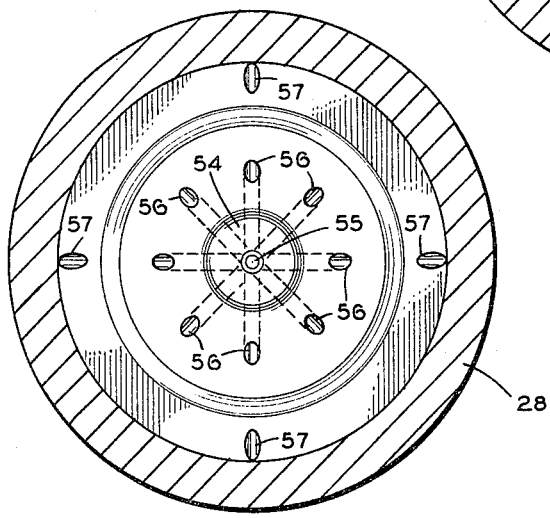
Figure 7A:
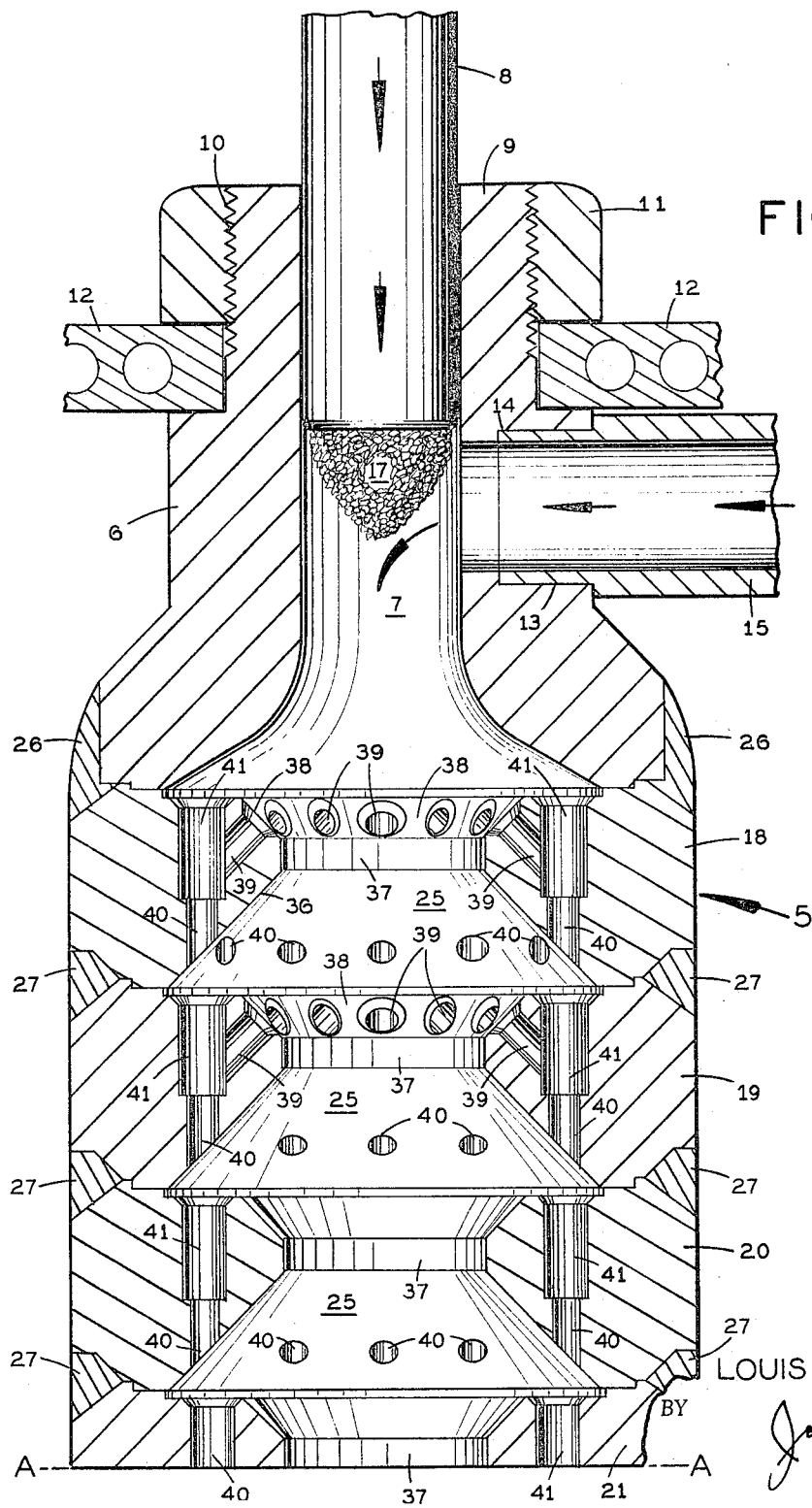

In the drawings:

FIGURE 1 is a side elevation of a cylinder constructed in accordance with the invention, FIGURE 2 is a plan view thereof, FIGURE 3 is a section taken substantially on line 3—3 of FIGURE 1, FIGURE 4 is a transverse section taken substantially on line 4—4 of FIGURE 1, FIGURE 5 is a transverse section taken substantially on line 5—5 of FIGURE 1, FIGURE 6 is a transverse section taken substantially on line 6—6 of FIGURE 1, FIGURES 7a and 7b are central vertical sections through the cylinder and with the sections being separated to permit the enlargement of the device and to permit a full illustration, the section being taken on line 7—7 of FIGURE 2, FIGURE 8 is a fragmentary section illustrating the traverse of the plastic granules as they are progressively fed downwardly by a piston, and FIGURE 9 is a similar view of a further segment.

Referring specifically to the drawings, there has been illustrated a cylinder 5. The cylinder at its upper end is provided with a concentric head portion 6. The head portion has a central bore 7 for the traverse movement of a piston 8. The head has a reduced neck portion 9 that is externally threaded at 10 to receive a locking nut 11 that serves to lock the cylinder to a water jacket 12 to effectively cool the upper end of the cylinder. Upon one side of the head 6 there is provided a bore 13 into which is frictionally engaged the reduced end 14 of a pipe 15 and with the pipe leading from a source of plastic pellet supply for injection into the bore 7, to be forced downwardly through the cylinder by the piston 8.

The cylinder 5 for convenience in maufacturing includes a plurality of segments 18, 19, 20, 21, 22, 23 and 24. The several segments 18–24 are concentrically recessed to provide cavities 25 and to facilitate the forming of the cavities, the segments 18 are machined separately and welded together to the head 6, as at 26 and with each segment being welded circumferentially as indicated at 27. The lower end of the cylinder is provided with a cap plate 28, welded to the next adjacent segment 24, as indicated at 29. The cap plate 28 is provided with a threaded axially disposed lug 30 that is exteriorly threaded at 31 for the reception of a threaded nut 32. The nut 32 has its threads extending entirely through to receive the threaded portion 33, of a reduced threaded shank 34 of a nozzle 35.

The cavity 25 of the segment 18 and all succeeding segments are concentric to the cylinder 5. The cavity of the segment 18 is provided with preferably polished tapered side walls 136. The side walls 36 lead into a reduced shoulder portion 37. The shoulder portion 37 terminates in an upward beveled wall 38. The wall 38 is provided with a circumferential and equidistantly spaced ports 39. The tapered walls 36, adjacent the lower edge of the segment is provided with a circumferential and equidistantly spaced row of ports 40. The ports 40 communicate with radically arranged and vertically disposed ports 41 and the ports 41 terminate upon the top side of the segment 18. The segment 19 is substantially identical to the segment 18 but here, the ports 39, 40 and 41 vary in number see particularly FIGURES 3 and 4. The segment 20 is substantially identical with the exception, that the ports 39 are omitted and with the ports 41 and 40 corresponding to the segment 19. The segment 21 is substantially identical to the segment 20. In the segment 22, the side walls 36 of the cavity are curved downwardly and outwardly from the shoulder 37 and with the curved side walls terminating the cavity in communication with reduced ports 42, corresponding to the ports 41 of the upper segments and with the segment 22 also being provided with the radial ports 43, communicating with the ports 42 closely adjacent to the bottom of the segment. The segment 23 is milled out at 44, to provide a flow passage 45 and with the passage 45 communicating with vertical ports 46 of the segment 23. The segment 23 also has its cavity formed with curved side walls 47. The lateral ports 43 of segments 22, have been omitted in the segment 23 while a shoulder 48 is arranged at the top of the curved walls 47 and the shoulder communicates with a beveled recess 49.

A segment 24, as clearly illustrated in FIGURES 6 and 7 is provides with an upwardly arcuate cavity 50. The segment 24 is provided with a plurality of vertically arranged and spaced apart ports 51 that extend from a milled out face 52, to the arcuate wall 53 and whereby the fluent plastics may have an even flow into the cavity 50.

The base plate 28 is provided with a raised central portion 54, that projects upwardly into the cavity 50. The base plate 28 is provided with an axial discharge port 55 that extends and terminates at the top of the raised portion 54 and also communicates with lateral ports 56. Diagonal and downwardly extending ports 57, communicate from the top of the segment 28 to the bore 55. The port 55 extends downwardly through the lug 30 and communicates with a discharge port 58 of the nozzle 35.

The cylinder 5 may be heated in any conventional manner such as by heater bands or heater sleeve, such as that illustrated in dotted lines at 59 in FIGURE 1. The heater element 59 heats the cylinder 5 and whereby the movement of the granular plastic pellets are progressively heated as they pass through the several cavities to be discharged through the port 55 and port 58 for discharge in any suitable mold, not shown through the nozzle 35.

*Operation*

In the operation of the device, the pellets are fed through the pipe 15 to the bore 7 to be acted upon by the piston 8 and the piston 8 is actuated to force the pellets downwardly into the first cavity 25. As the piston progresses downwardly a relatively cone-shaped group of unmelted pellets will form upon the bottom of the piston in a stagnant group shown at 17 in FIGURE 7. The cone-shaped group of pellets produces a side compressive action upon the previously inserted pellets causing the pellets that have initially started the melting action to be spread outwardly and forced through the ports 41 through the medium of the angular ports 39. As the pellets are forced through the ports 41, the reduced diameter portions forming the lower portion of the ports will prevent any relatively large pellet from entering into the next adjacent cavity. The reduced ports 41a functions to avoid any back pressure when the piston enters the next cavity 25 of the segment 19. All of the ports 40 and their reduced bores function to resist the movement of unmelted pellets into the cavity and retards their flow prior to the entry into the next adjacent segment. This restrictive action prevents any unmelted pellets from moving downward toward the final discharge dispersion plate 24 and with the pellets at this point being entirely melted to flow down through the ports 51 in the dispersion plate to enter the cavity 50 defined by the arcuate wall 53 and the projecting relatively conical-shaped protuberance 54 upon the end plate 28, where the melted plastic will flow downwardly through the port 55, outwardly and downwardly through the ports 57 that are joined to the port 55 where the fluid enters the port 58 in the nozzle 35 to be subsequently discharged into a suitable mold device. FIGURES 8 and 9 illustrate the general disposition of the pellets immediately before and immediately after the pellets have been melted to flow to the nozzle 35. As the pellets progress downwardly through the cylinder they will be progressively melted by the heated segments and a relatively thin coating of the melted plastic will adhere to the side walls of the several segments, such being indicated in FIGURES 8 and 9 by the relatively heavy stippling. As the piston 8 moves downwardly, it compresses the pellets and forces the pellets laterally to engage the side walls of the several cavities and to also force the pellets down through the ports 41 and 41a.

It will be apparent from the foregoing that a very novel type of plastic melting and injection device has been provided. The piston progressively forces the pellets down that enter through the pipe 15, into the bore 7 and the piston traverses substantially all of the segments 18–24, creating a uniform injection of the pellets and the uniform melting of the pellets as they are forced through each of the segments, having side pressure that causes certain of the pellets to travel laterally of each cavity to move downwardly through the ports 41, 42 and 46 thus, the pellets are all evenly heated and progressively melted to a fluent state prior to the movement of the fluent plastic through the ports 51 of the plate 24 and final discharge through the ports 55, 56 and 57 thus, creating an even flow of the plastic throughout the circumference of the cavity 50. Plastic cylinders have heretofore been employed of the torpedo type that normally resists the melting of the plastic. The torpedo or cold screw type also retards the flow of the plastic. This device is uniformly heated and the piston progressively forces the plastic through the several segments where the plastic is uniformly heated and melted. The device is relatively simple, permits less travel time on the piston, injecting the material because of the cushion effect on the injection pressure as the pellets are shifted laterally to engage the relatively large amount of heating surface within each of the segments and provides a cylinder that is so constructed that the pellets are melted in a minimum of time, producing a more rapid operation of the device.

It is to be understood that the invention is not limited to the precise construction shown, but that changes are contemplated as readily fall within the spirit of the invention as shall be determined by the scope of the subjoined claims.

I claim:
1. A plastic injection device comprising, a cylinder, a plurality of connected annular stacked segments forming an axial extension of the cylinder, a plurality of said segments each being provided with a substantially frustoconical cavity, each cavity having a flared extension at its top, a plurality of vertical ports arranged around each cavity, the ports in each segment being in communication with those in the segment located below it, the flared extensions of some of the cavities having angular ports establishing communication with the vertical ports, a cap member provided on the lower end of the stack of segments, the segment above the said cap member being a dispersion plate and being recessed in its lower surface and having ports passing through it to communicate with the cavity that is located directly above it, the cap member having a raised central part fitting in and spaced from the recess, the cap member having an outlet port, and ports extending through a wall defining the recess and communicating with the outlet, and the outlet terminating in a nozzle.

2. A progressive plastic injection device comprising, a cylinder composed of a stack of concentric united segments, the cylinder having a head portion in which a piston is operative, the head portion being embraced by a water jacket for cooling purposes, a pipe leading into the interior of the head portion and through which plastic material is delivered into the interior of the cylinder, some of the segments having a central flared cavity, several of the segments being provided with a circular row of vertically-disposed ports in communication with upper parts of the cavities, the uppermost segment in the stack having angular ports which communicate with those in the circular rows, the ports in the circular rows having a larger diameter upper portion and a smaller diameter lower portion, one of the segments located adjacent to the lower end of the stack having an arcuate recess in its lower surface, the lowermost segment having a central raised portion extending into but spaced from said recess, the arcuate recess being in communication with the cavity formed in the segment that is located above the recessed segment, and the lowermost segment in the stack having a central outlet and having ports which establish communication between said outlet and the recess.

3. The structure according to claim 1 wherein the several segments, the head portion, the dispersion plate and the base plate are all welded together to form a cylinder, the several segments being initially formed with their side walls polished prior to assembly and welding and with all of the segments, the head portion, the dispersion plate and the base plate being concentric and having a common axial center, the several cavities functioning to progressively melt the pellets as they are forced downwardly by the piston.

4. A progressive plastic injection device of the character described comprising an elongated cylinder composed of a plurality of segments having cavities in each of the segments, at least some of the segments having bores, a head portion upon the cylinder provided with an axial bore, a piston slidable in the bore for movement downwardly throughout the several cavities, an inlet pipe for the head portion and through which plastic pellets are injected into the bore, the cylinder being provided with an external heated jacket, a dispersion plate connected to the last segment, a base plate, and all of the segments and the several plates being united together, the base plate being provided with an axially arranged stud upon its bottom with the stud being externally threaded, an elongated nut threaded upon the stud with the nut being threaded throughout its length, a discharge nozzle that is externally threaded for threaded engagement into the nut to abut the lower end of the stud and a port extending through the base plate, the stud and the nozzle and whereby to inject fluent plastic into a mold, the said piston when shifted downwardly forcing the plastic pellets progressively through the bores of the segments to be progressively heated and melted as the piston progresses downwardly to the cavity of the last segment for forcing the melted plastic pellets through the dispersion plate and for forcing the melted plastic through the bore of the base plate.

References Cited by the Examiner

UNITED STATES PATENTS 2,962,759 12/1960 Maccaferri _____ 18—30
3,110,932 11/1963 Fischer _____ 18—30

FOREIGN PATENTS 231,150 1/1964 Austria.

J. SPENCER OVERHOLSER, *Primary Examiner.*

W. L. McBAY, *Assistant Examiner.*